US007590302B1

(12) United States Patent
Woodall

(10) Patent No.: US 7,590,302 B1
(45) Date of Patent: Sep. 15, 2009

(54) IMAGE EDGE ENHANCEMENT SYSTEM AND METHOD

(75) Inventor: Neil D. Woodall, Newport Beach, CA (US)

(73) Assignee: Pixelworks, Inc., Tualatin, OR (US)

( * ) Notice: Subject to any disclaimer, the term of this patent is extended or adjusted under 35 U.S.C. 154(b) by 1005 days.

(21) Appl. No.: 10/979,688

(22) Filed: Nov. 1, 2004

(51) Int. Cl.
G06K 9/00 (2006.01)
(52) U.S. Cl. ............................. 382/266; 382/263
(58) Field of Classification Search ......... 348/625–631; 382/263, 266
See application file for complete search history.

(56) References Cited

U.S. PATENT DOCUMENTS

| 4,030,121 | A | 6/1977 | Faroudja |
| 4,262,304 | A | 4/1981 | Faroudja |
| 4,847,681 | A | 7/1989 | Faroudja et al. |
| 4,935,806 | A | 6/1990 | Rabii |
| 5,550,936 | A * | 8/1996 | Someya et al. ............ 382/263 |
| 5,920,357 | A | 7/1999 | Ohara |
| 7,194,142 | B2 * | 3/2007 | Maurer ..................... 382/258 |
| 2005/0168644 | A1 * | 8/2005 | Demas et al. ............. 348/630 |

* cited by examiner

*Primary Examiner*—Bhavesh M Mehta
*Assistant Examiner*—Sean Motsinger
(74) *Attorney, Agent, or Firm*—Marger Johnson & McCollom, P.C.

(57) ABSTRACT

We describe and claim an edge enhancement system and method. The edge enhancement system includes an edge enhancement circuit to enhance a portion of image data with enhancement data determined from the image data, and a panel to display the enhanced image data. The edge enhancement circuit includes a receiver to receive the image data, a determining circuit to determine enhancement data from the image data, and an enhancing circuit to enhance a portion of the image data with the enhancement data. In an embodiment, the enhancing circuit mathematically manipulates a portion of the image data with the enhancement data. In another embodiment, the enhancing circuit replaces a portion of the image data with the enhancement data.

26 Claims, 6 Drawing Sheets

IMAGE EDGE ENHANCEMENT SYSTEM AND METHOD

FIELD OF THE INVENTION

This invention relates generally to image enhancement and, more specifically, to a system and method for image edge enhancement.

BACKGROUND OF THE INVENTION

In the last few years, high-resolution video displays, e.g., high definition televisions (HDTVs) and flat panel displays (FPDs), have become commonplace in the video display market. When using these high-resolution video displays to display a video signal from a normal resolution source, e.g., digital video disk (DVD) or videocassette recorder (VCR), the normal resolution signal must be scaled to a high-resolution signal. The scaled high-resolution signal often lacks high frequency components that cause the displayed image to look soft or out of focus. While it is difficult to recover details lost to scaling, the apparent sharpness of a displayed image may be improved by image edge enhancement.

To enhance the edges of an image, the luminance, the chrominance, or both components of the video signal corresponding to the edges need to have their transitions enhanced. Many techniques for enhancing edge transitions exist. For instance, optimizing a traditional sharpening filter with a distortion component enhances the edge transitions, where the distortion component is derived from either the amplitude (luminance portion) or color frequency response (chrominance portion) of the edge to be sharpened. The luminance technique, however, is dependent upon the original amplitude of each edge, and thus causes a disproportionate number of enhancements to be applied to low amplitude details. And using a distortion component may generate false edges and image ringing when the input video signal is outside of the traditional sharpening filter's predetermined amplitude or frequency range. The chrominance implementation also generates false edges and image ringing when there are several closely spaced high frequency details. Furthermore, the chrominance implementation may only be performed in those areas enhanced by the luminance technique.

To limit this problem of generating false images and image ringing, one approach only displays edge enhancements in areas defined by prior images of the video signal. Thus, false images and image ringing due to edge enhancements, as well as the edge enhancements themselves, only occur in those defined areas. The limitation of false images and image ringing, therefore, comes at an overall image sharpness loss.

Accordingly, a need remains for an improved image edge enhancement system and method that enhances image edges regardless of the input video signal source or content without creating false images or generating image ringing.

BRIEF DESCRIPTION OF THE DRAWINGS

The foregoing and other objects, features, and advantages of the invention will become more readily apparent from the following detailed description of a preferred embodiment that proceeds with reference to the following drawings.

DESCRIPTION OF THE INVENTION

Figure 1:
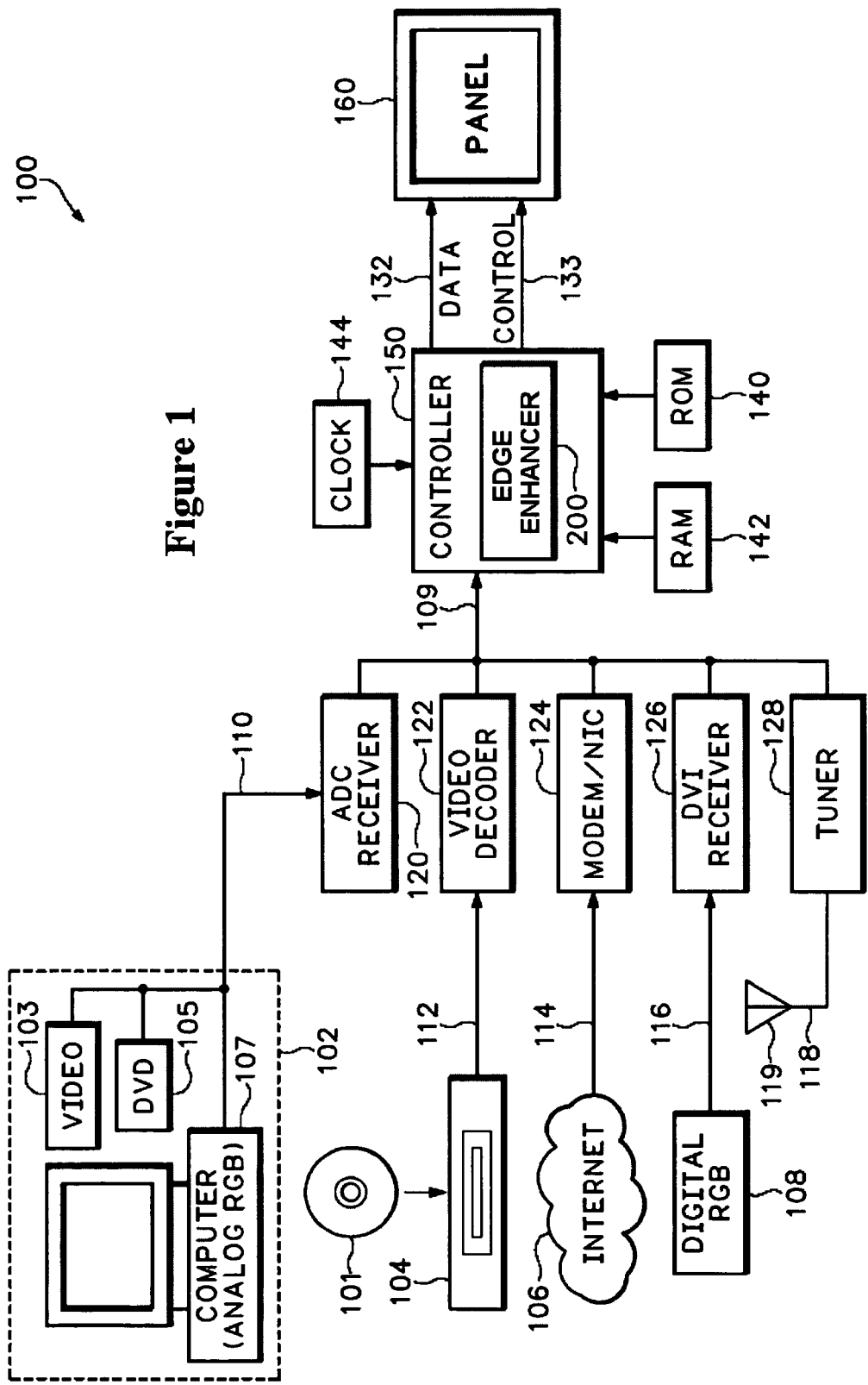
FIG. 1 is a block diagram of an edge enhancement system.

FIG. 1 is a block diagram of an edge enhancement system 100. Referring to FIG. 1, the system 100 includes a receiver 120 for receiving an analog image data signal 110, e.g., RGB or $YP_BP_R$ signal, from a source 102. The source 102 may be a personal computer 107, a digital video disk player 105, set top box (STB) 103, or any other device capable of generating the analog image data signal 110. The receiver 120 may be an analog-to-digital converter (ADC) or any other device capable of generating digital video signal 109 from the analog image data 110. The receiver 120 converts the analog image data signal 110 into the digital image data 109 and provides it to a controller 150. A person of reasonable skill in the art knows well the design and operation of the source 102 and the receiver 120.

Likewise, a video receiver or decoder 122 decodes an analog video signal 112 from a video source 104. The video source 104 may be a video camcorder, tape player, digital video disk (DVD) player, or any other device capable of generating the analog video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the digital video signal 109 and provides it to the panel controller 150. The decoder 122 is any device capable of generating digital video signal 109, e.g., in Y/C or CVBS format, from the analog video signal 112. A person of reasonable skill in the art knows well the design and operation of the video source 104 and the video decoder 112.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving data 114 from a network 106. The modem 124 provides digital video signal 109 to the panel controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides digital video signal 109 to the panel controller 150. A person of reasonable skill in the art knows well the design and operation of the source 108 and the receiver 126.

A tuner 128 receives a wireless signal 118 transmitted by the antenna 119. The antenna 119 is any device capable of wirelessly transmitting or broadcasting the signal 118 to the tuner 128. In an embodiment, the antenna 119 transmits a television signal 118 to the television tuner 128. The tuner 128 may be any device capable of receiving a signal 118 transmitted wirelessly by any other device, e.g., the antenna 119, and of generating the digital video signal 109 from the wireless signal 118. The tuner 128 provides the digital video signal 109 to the controller 150. A person of reasonable skill in the art knows well the design and operation of the antenna 119 and the tuner 128.

The digital video signal 109 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals are processed separately and, ideally, encoding into a composite video signal occurs only once, prior to transmission. The digital video signal 109 may be a stream of digital numbers describing a continuous analog video waveform in either composite or component form. FIG. 1 describes a variety of devices (and manners) in which the digital video signal 109 may be generated from an analog video signal or other sources. A person of reasonable skill in the art should recognize other devices for generating the digital video signal 109 come within the scope of the present invention.

The controller 150 generates image data 132 and control signals 133 by manipulating the digital video signal 109. The panel controller 150 provides the image data 132 and control signals 133 to a panel device 160. The panel 160 includes a pixelated display that has a fixed pixel structure. Examples of pixelated displays are active and passive LCD displays, plasma displays (PDP), field emissive displays (FED), electro-luminescent (EL) displays, micro-mirror technology displays, low temperature polysilicon (LTPS) displays, and the like. A person of reasonable skill in the art should recognize that flat panel 160 may be a television, monitor, projector, personal digital assistant, and other like applications.

In an embodiment, the controller 150 may scale the digital video signal 109 for display by the panel 160 using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the digital video signal 109. Scaling, resolution, frame, and/or pixel rate conversion are not central to this invention and are not discussed in further detail.

The controller 150 includes an edge enhancer 200 for enhancing image data corresponding to an edge of an image and providing the enhanced image data 132 to the panel 160. The edge enhancer 200 may, optionally, provide the enhanced image data 132 to the controller 150, where the controller 150 subsequently provides the enhanced image data 132 to the panel 160. The edge enhancer 200 may be integrated into a monolithic integrated circuit or hardwired using any number of discrete logic and other components. Alternatively, the controller 150 may be a dedicated processor system that includes a microcontroller or a microprocessor to implement the edge enhancer 200 as a software program or algorithm.

Read-only (ROM) and random access (RAM) memories 140 and 142, respectively, are coupled to the display system controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, may be external or internal to the controller 150. RAM memory 142 may be a flash type memory device. Clock 144 controls timing associated with various operations of the controller 150.

Figure 2:
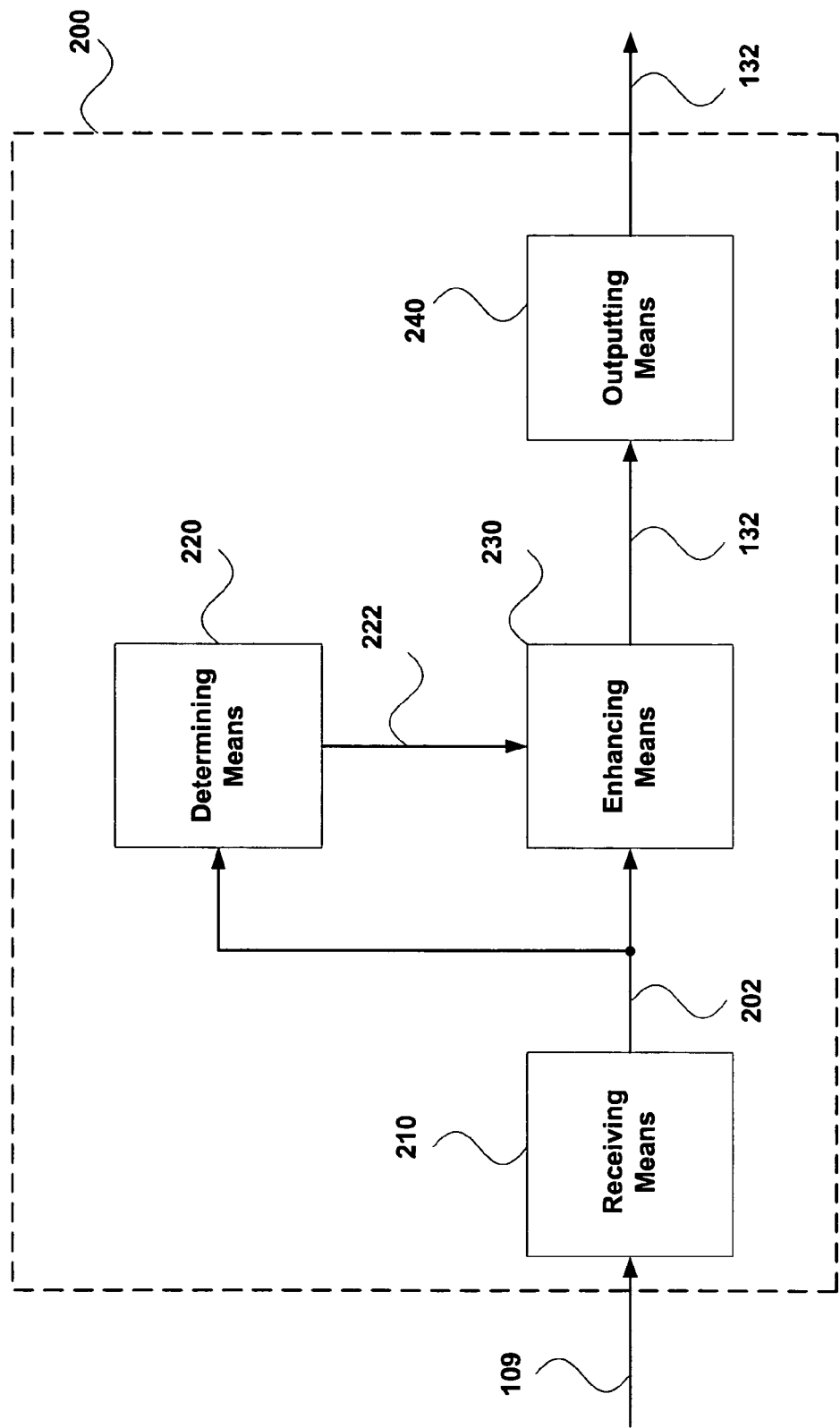
FIG. 2 is a block diagram of an embodiment of the edge enhancer shown in FIG. 1.

The structure and operation of the edge enhancer 200 will be explained with reference to FIGS. 2-9. FIG. 2 is a block diagram of an embodiment of the edge enhancer 200 shown in FIG. 1. Referring to FIG. 2, the edge enhancer 200 includes a receiving means 210 for providing image data 202 corresponding to an edge of an image to a determining means 220 and an enhancing means 230. The receiving means 210 may include a manipulating means, e.g., an image scaler, or Y/C separator with various combinations of two-dimensional and/or three dimensional comb filters, or the like, capable of generating the image data 202 by manipulating a digital video signal 109. Alternatively, the image data 202 may be received from the controller 150, where the controller 150 generates the image data 202 by manipulating a digital video signal 109. For the sake of convenience in the description of embodiments of the invention only, it will be assumed that the receiving means 210 receives the digital video signal 109.

The receiving means 210 may be implemented as a receiver, an integrated circuit or a portion thereof, a hardwired module using any number of discrete logic and other components, a software program or algorithm, or the like. The receiving means 210 is well known to a person of reasonable skill in the art. We will not discuss the receiving means 210 in any further detail.

In an embodiment, the image data 202 may comprise three portions, e.g., A, B, and C, where each portion of the image data 202 may represent a pixel, a group of pixels, a function representing a group of pixels, or the like. Each portion, e.g., A, B, and C, may represent YUV data where Y represents a luminance amplitude, e.g., $A_l$, $B_l$, and $C_l$, and the UV represents a chrominance vector, e.g., $A_c$, $B_c$, and $C_c$. Each chrominance vector represents two color components U and V, e.g., $A_c=[A_{c_U}, A_{c_V}]$, $B_c=[B_{c_U}, B_{c_V}]$, and $C_c=[C_{c_U}, C_{c_V}]$, where each UV color component combination represents a point relative to [0,0] on the UV color plane. The YUV data, UV color plane, luminance amplitude, and chrominance vector are well known to a person of reasonable skill in the art.

The determining means 220 determines enhancement data 222 from the image data 202 and provides the enhancement data 222 to the enhancing means 230. In an embodiment, the enhancement data 222 comprises an enhancement luminance amplitude and an enhancement chrominance vector, where the enhancement luminance amplitude comprises a Y portion of YUV data and the enhancement chrominance vector comprises the UV portions of YUV data. The enhancement means 230 enhances a portion of the image data 202 with the enhancement data 222, and provides the enhanced image data 132 to an outputting means 240. The determining means 220 and the enhancement means 230 may be implemented in an integrated circuit or a portion thereof, a hardwired module using any number of discrete logic and other components, a software program or algorithm, or the like. The determining means 220 and the enhancement means 230 may be implemented separately, incorporated in a single module or program, or integrated as any combination thereof. We explain the operation of the determining means 220 and enhancement means 230 in more detail below.

Figure 3:
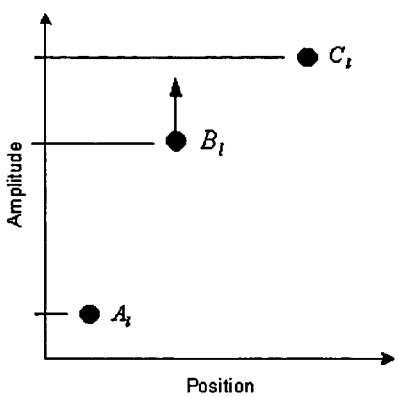
FIG. 3 is a graph of an embodiment of luminance amplitude edge enhancement.

FIG. 3 is a graph of an embodiment of luminance amplitude edge enhancement. Referring to FIG. 3, luminance amplitudes $A_l$, $B_l$, and $C_l$ of the image data 202 are plotted with respect to their position in the image, where the luminance transition between $A_l$ and $C_l$ defines an edge of the image. Luminance amplitude edge enhancement consists of manipulating the luminance amplitude $B_l$ so it is closer to either $A_l$ or $C_l$. In the illustrated embodiment, $B_l$ is shifted toward $C_l$ resulting in an enhanced luminance transition on the image edge. Although not explicitly shown, enhancing the color transitions using the chrominance vectors $A_c$, $B_c$, and $C_c$ may occur similarly to the above-illustrated embodiment, where the color components represented by chrominance vector $B_c$, e.g., $B_{c_U}$ and $B_{c_V}$, are shifted towards the corresponding color represented in either chrominance vectors $A_c$ or $C_c$, e.g., $A_{c_U}$ and $A_{c_V}$, or $C_{c_U}$ and $C_{c_V}$.

Returning to FIG. 2, the enhancement data 222 may be used by the enhancing means 230 to enhance a portion of the image data 202. In an embodiment, the enhancement means 230 may enhance the luminance amplitude and the chrominance vector of the portion of the image data 202 with the enhancement luminance amplitude and the enhancement chrominance vector of the enhancement data 222, respectively.

In another embodiment, the enhancement data 222 may be an offset value used by the enhancing means 230 to enhance portion B of the image data 202. The offset value may consist of the luminance amplitude, e.g., $Offset_l$, and the chrominance vector, e.g., $Offset_{c_U}$ and $Offset_{c_V}$, where each are individually determined according to Equation 1.

$$Offset_{l,c} = DFS_{l,c} \times MIN(|2^{nd}Diff_{l,c}|, |1^{st}Diff_{l,c}|) - 2 \times 2^{nd}Diff_{l,c}$$ Equation 1

The differential sign ($DFS_{l,c}$) is equal to −1 when the second differential signal ($2^{nd}Diff$) is negative and equal to +1 otherwise. The minimum (MIN) function selects the smallest of the absolute value of the first differential signal ($1^{st} Diff_{l,c}$) and the absolute value of the second differential signal ($2^{nd} Diff_{l,c}$). The first differential signal ($1^{st} Diff_{l,c}$) is determined according to Equation 2.

$$1^{st}Diff_{l,c} = (A_{l,c} - C_{l,c})/2$$ Equation 2

The second differential signal ($2^{nd} Diff_{l,c}$) is determined according to Equation 3.

$$2^{nd}Diff_{l,c} = (2B_{l,c} - A_{l,c} - C_{l,c})/4$$ Equation 3

In an embodiment, the offset value is set to zero when its sign is not equal to the sign of the second differential. This operation is performed to prevent ringing on the edges of transitions. In another embodiment, the offset value may be manipulated, preferably though filtering, to further reduce aliasing artifacts. The determining means 220, then provides the offset value to the enhancing means 230 as enhancement data 222.

In yet another embodiment, the enhancement data 222 is a replacement value used by the enhancing means 230 to replace a portion of the image data 202. The replacement value is, preferably, the offset value added to portion B. The determining means 220, then provides the replacement value to the enhancing means 230 as enhancement data 222.

In yet another embodiment, the determining means 220 may determine the enhancement data 222 with an edge enhancement parameter (M) capable of controlling the aggressiveness of the edge enhancement according to Equation 4.

$$Offset_{l,c} = DFS_{l,c} \times MIN(|M \times 2^{nd}Diff_{l,c}|, |1^{st}Diff_{l,c}|) - 2 \times 2^{nd}Diff_{l,c}$$

Figure 4:
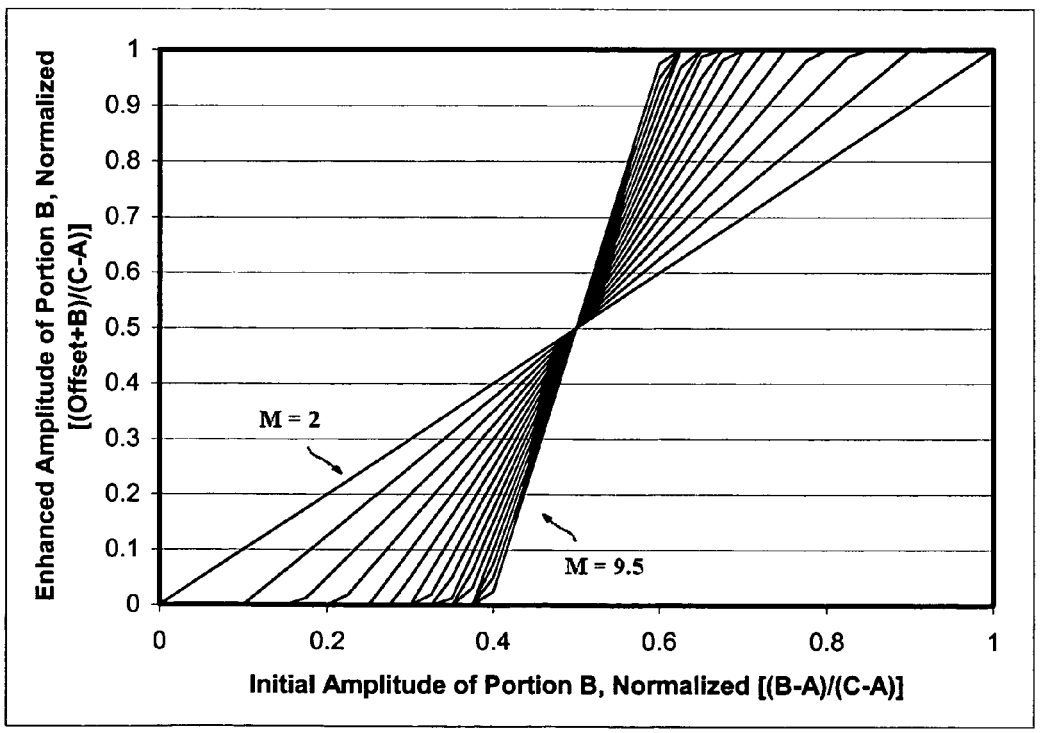
FIG. 4 is an illustrative chart of the edge enhancer's performance for various values of the edge enhancement parameter (M).

M is preferably a constant value multiplied by the second differential signal ($2^{nd} Diff_{l,c}$) within the minimum (MIN) function. In an embodiment, M may be represented as YUV data, where the luminance amplitude portion of the offset value $Offset_l$ uses the Y portion, e.g., $M_l$, of M, and the chrominance vector components, of the offset value $Offset_c$ use the UV portions, e.g., $M_{c_U}$ and $M_{c_V}$. FIG. 4 is an illustrative chart of the edge enhancer's 200 performance for various values of M. Referring to FIG. 4, a set of transfer curves is shown, where each curve is the enhanced amplitude of portion B with respect to the initial amplitude of portion B for a given value of M. In the present illustration, the initial and enhanced amplitudes are normalized with respect to portions A and C, and M is varied from 2 to 9.5 in increments of 0.5. As M increases the enhanced amplitude of portion B is shifted more aggressively towards either portion A or portion C.

In an embodiment, M may be a function of the image content, where the value of M is varied depending on luminance amplitudes and chrominance vectors corresponding to the image edge.

Returning to FIG. 2, the determining means 220 checks the enhancement data 222 for an error condition capable of causing a divergent color shift in the enhanced image data 132. The enhancing means 230 may, alternatively, perform this check prior to providing the enhanced image data 132 to either the panel 160 or the controller 150. The error condition may arise when the edges between the U and the V channel are misaligned during the determining of the enhancement data 222. We explain the divergent color shift in FIGS. 5 and 6, and the error correction example embodiment in FIG. 7.

Figure 5:
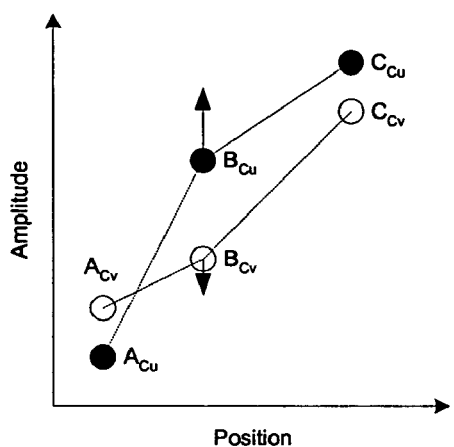
FIG. 5 is a diagram of an embodiment of an edge enhancement error condition.
Figure 6:
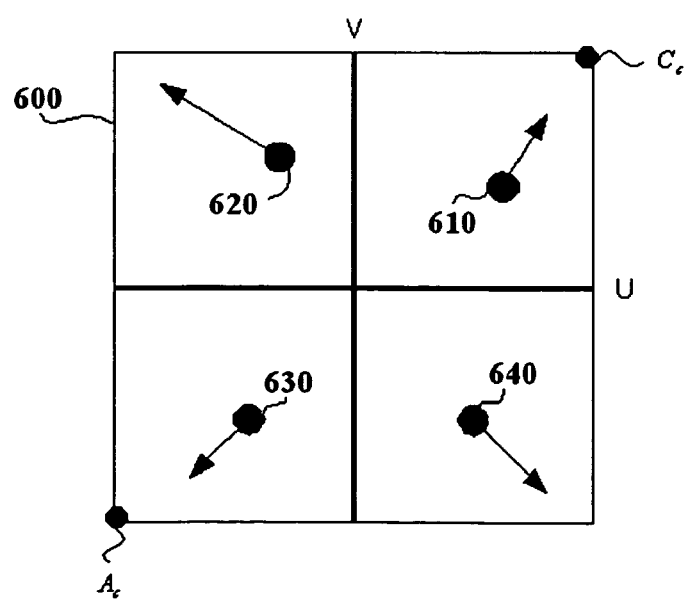
FIG. 6 is a UV plane diagram of the edge enhancement error condition.

FIGS. 5 and 6 are diagrams of an edge enhancement error condition. Referring to FIG. 5, the chrominance vectors $A_c$, $B_c$, and $C_c$, represented in their UV color components, are plotted with respect to their position in the image. In the present illustration, the edges of the U and the V channels are misaligned during the determination of the enhancement chrominance vector causing $B_{C_U}$ to shift towards $C_{C_U}$, and $B_{C_V}$ to shift towards $A_{C_V}$. These $B_{C_V}$ and $B_{C_V}$ shifts to opposing chrominance vectors creates an enhancement chrominance vector that is farther away from both $A_c$ and $C_c$, and thus a divergent color shift in the edge of the image. Referring to FIG. 6, a UV plane 600 includes chrominance vectors $A_c$ and $C_c$ in the lower left and upper right corners, respectively. Points 610, 620, 630, and 640 illustrate possible initial locations of chrominance vector $B_c$, where the arrows corresponding to each point indicate the direction each point is shifted upon enhancement. The presence of the error condition causes points 620 and 640 to diverge from chrominance vectors $A_c$ and $C_c$, and thus a divergent color shift in the edge of the image.

Figure 7:
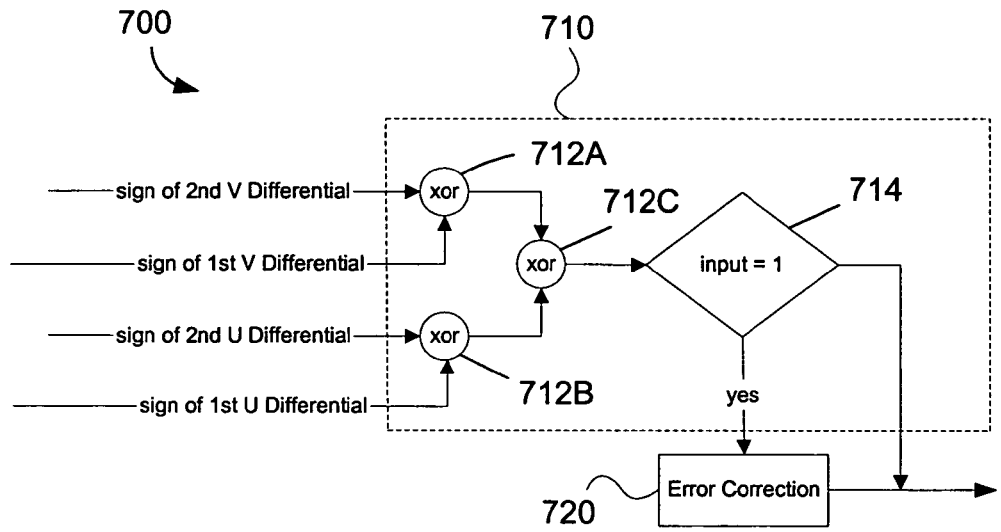
FIG. 7 is an operational diagram of an error detection embodiment within the edge enhancer 200 of FIG. 2.

FIG. 7 is an operational diagram of an error detection embodiment within the edge enhancer 200 of FIG. 2. Referring to FIG. 7, an error detector 700 includes combinational logic 710 to determine when an error condition is present, and an error corrector 720 to correct the error condition responsive to the combinational logic 710. In an embodiment, the combinational logic 710 comprises plurality of XOR gates, e.g., 712A, 712B, and 712C, and a decision block 714, where gate 712A and gate 712B each receive the sign of the first and second differentials for the U and V components of the enhancement chrominance vector, respectively, and each provide their corresponding results to gate 713C. Gate 713 propagates a result to the decision block 714, where the decision block 714 may activate the error corrector 720 in response to the result. In another embodiment, the error corrector 720, when activated, may adjust the enhancement chrominance vector, e.g., reducing the chrominance vector by the second differential signal ($2^{nd}$ Diff$_c$) of the opposite color in the U-V color plane, to eliminate the error condition. Error detector 700 may be incorporated into either determining means 220 or enhancing means 230.

Figure 8:
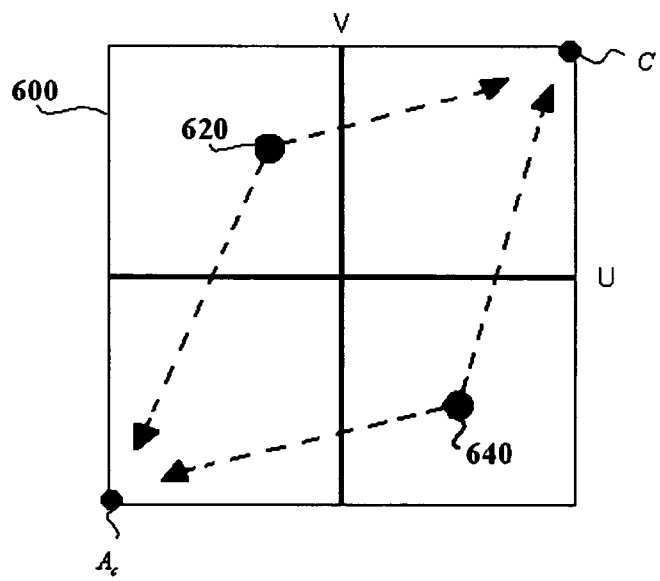
FIG. 8 is a UV plane diagram illustrating an example of edge enhancement error correction.

FIG. 8 is a UV plane diagram illustrating an example of edge enhancement error correction. Referring to FIGS. 6-8, the UV plane 600 includes chrominance vectors $A_c$ and $C_c$ in the lower left and upper right corners, respectively, and points 620 and 640. As noted above, the presence of an error condition causes points 620 and 640 to diverge from chrominance vectors $A_c$ and $C_c$, creating a divergent color shift in the edge of the image. After an error correction by error corrector 700, however, points 620 and 640 are correctly shifted towards chrominance vectors $A_c$ and $C_c$, and thus eliminating the potential divergent color shift in the image edge.

Returning to FIG. 2, the enhancing means 230 is capable of generating enhanced image data 132 by enhancing a portion of the image data 202 with the enhanced data 222. In an embodiment, the enhancing means 230 may enhance portion B of the image data 202 by adding it with the offset value. In another embodiment, the enhancing means 230 may enhance portion B of the image data 202 by replacing it with the replacement value. The enhancing means 230 provides the enhanced image data 132 to an outputting means 240 capable of providing the enhanced image data 132 to the panel 160. The outputting means 240 is capable of providing the enhanced image data 132 to the controller 150.

Since the enhanced image data 132 is calculated directly from the image data 202, the edge enhancer 200 enhances image edges regardless of the input video signal source or content without creating false images or generating image ringing in the process. Also, by separately determining the enhancement chrominance vector and the enhancement luminance amplitude, the edge enhancer 200 can enhance the color transitions of an image edge without requiring a corresponding luminance enhancement.

The invention additionally provides a method, which is described below. The invention provides apparatus that performs or assists in performing the method of the invention. This apparatus might be specially constructed for the required purposes or it might comprise a general-purpose computer selectively activated or reconfigured by a computer program stored in the computer. The method and algorithm presented herein are not necessarily inherently related to any particular computer or other apparatus. In particular, various general-purpose machines might be used with programs in accordance with the teachings herein or it might prove more convenient to construct more specialized apparatus to perform the method. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The method is most advantageously implemented as a program for a computing machine, such as a general-purpose computer, a special purpose computer, a microprocessor, and the like. The invention also provides a storage medium that has the program of the invention stored thereon. The storage medium is a computer-readable medium, such as a memory, and is read by the computing machine mentioned above.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories or separate machines where the memories or machines reside in the same or different geographic location. Where the memories or machines are in different geographic locations, they may be connected directly or through a network such as a local access network (LAN) or a global computer network like the Internet®.

A person having ordinary skill in the art should recognize that the blocks described below might be implemented in different combinations, and in different order. Some methods may be used for determining a location of an object, some to determine an identity of an object, and some both.

Figure 9:
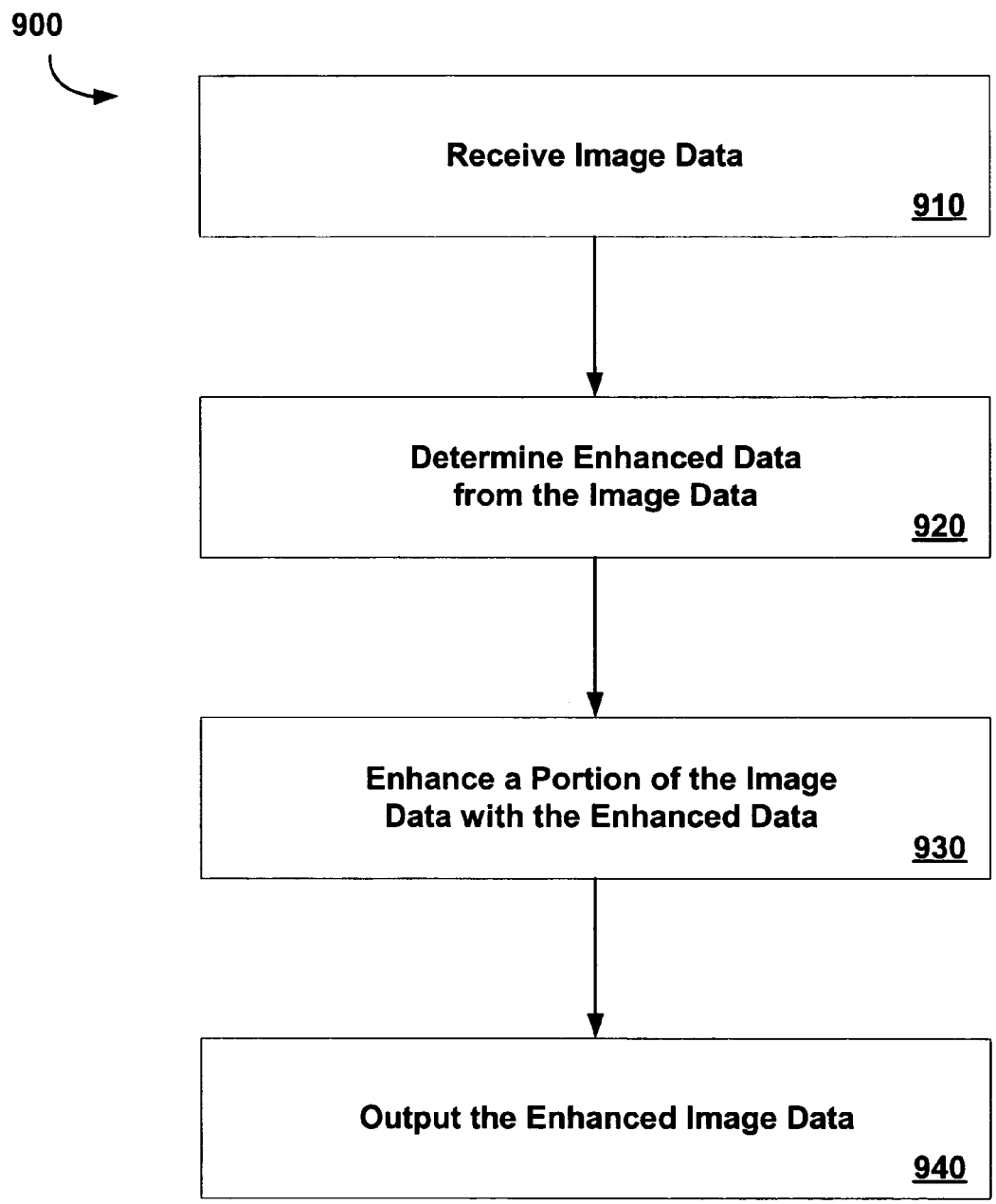
FIG. 9 is a flowchart of an embodiment of a method for enhancing image data.

FIG. 9 is a flowchart of an embodiment of a method for enhancing image data. Referring to FIG. 9, the edge enhancer 200 receives image data at block 910. In an embodiment, the edge enhancer 200 may receive image data 202 from the controller 150, where the controller 150 may generate the image data 202 by manipulating a digital signal 109 prior to providing the image data 202 to the edge enhancer 200. In another embodiment, the edge enhancer 200 may directly receive image data 202 as digital signal 109. At block 920, the edge enhancer 200 determines enhanced data 222 from the image data 202. The enhanced data 222 may be either an offset value or a replacement value. In an embodiment, the edge enhancer 200 may check the enhanced data 222 for chrominance errors. In another embodiment, the edge enhancer 200 may check for chrominance errors during the determination of the enhanced data 222. At a block 930, the edge enhancer 200 enhances a portion of the image data 202 with the enhanced data 222. When the enhancement data 222 is the offset value, the edge enhancer 200 enhances the portion of the image data 202 by adding the offset value to the portion of image data 202. When the enhancement data 222 is the replacement value, the edge enhancer 200 enhances a portion of the image data 202 by replacing it with the enhancement data 222. At a block 940, the edge enhancer 200 outputs the enhanced image data 132. The edge enhancer 200 may output the enhanced image data 132 to the panel 160 or to the controller 150.

Having illustrated and described the principles of our invention, it should be readily apparent to those skilled in the art that the invention may be modified in arrangement and detail without departing from such principles. I claim all modifications coming within the spirit and scope of the accompanying claims.

I claim the following:

1. A system comprising:
an edge enhancer to enhance a portion of image data with enhancement data determined from the image data, where the image data corresponds to an edge of an image, and where the enhancement data comprises an offset value, the edge enhancer comprising:
a receiver to receive the image data;
a determining circuit to determine the enhancement data from the image data where the determining circuit determines the offset value from a first differential signal and a second differential signal,
where the offset value comprises an enhancement luminance amplitude and an enhancement chrominance vector,
wherein the enhancement luminance amplitude is determined according to the following equation:

$$\text{Offset}_l = \text{DFS}_l \times \text{MIN}(|2^{nd}\text{Diff}_l|, |1^{st}\text{Diff}_l|) - 2 \times 2^{nd}\text{Diff}_l$$

where $\text{Offset}_l$ is the enhancement luminance amplitude, $1^{st}\text{Diff}_l$ is the first differential signal, and $2^{nd}\text{Diff}_l$ is the second differential signal, and
where the first differential signal is determined from a first and a third portion of the image data and the second differential signal is determined from the first, a second, and the third portions of the image data; and
an enhancing circuit to enhance the portion of the image data with the enhancement data; and
a panel to display the enhanced image data.

2. The system of claim 1 comprising a transmitter to output the enhanced image data to a display.

3. The system of claim 1
where the offset value is the enhancement data; and
where the enhancing circuit mathematically manipulates the second portion of the image data with the offset value.

4. The system of claim 1 where the determining circuit determines the enhancement data by mathematically manipulating the second portion of image data with the offset value.

5. The system of claim 4 where the enhancement data corresponds to the first portion of the image data.

6. The system of claim 1 where the offset value is determined from an edge enhancement parameter capable of controlling the intensity of the offset value.

7. The system of claim 1 where each portion of the image data comprises a corresponding luminance amplitude and a corresponding chrominance vector.

8. The system of claim 7 where the determining circuit determines the enhancement luminance amplitude from the first, second, and third luminance amplitude, and the enhancement chrominance vector from the first, second, and third chrominance vector.

9. The system of claim 1 where the determining circuit checks the enhancement data for an error condition capable of causing a divergent color shift in the image data, and adjusts the enhanced image data to eliminate the divergent color shift.

10. A system comprising:
an edge enhancer to enhance a portion of image data with enhancement data determined from the image data, where the image data corresponds to an edge of an image, and where the enhancement data comprises an offset value, the edge enhancer comprising:
a receiver to receive the image data;
a determining circuit to determine the enhancement data from the image data where the determining circuit determines the offset value from a first differential signal and a second differential signal,
where the offset value comprises an enhancement luminance amplitude and an enhancement chrominance vector, and
wherein the enhancement chrominance vector is determined according to the following equation:

$$\text{Offset}_c = \text{DFS}_c \times \text{MIN}(|2^{nd}\text{Diff}_c|, |1^{st}\text{Diff}_c|) - 2 \times 2^{nd}\text{Diff}_c$$

where $\text{Offset}_c$ is the enhancement chrominance vector, $1^{st}\text{Diff}_c$ is the first differential signal, and $2^{nd}\text{Diff}_c$ is the second differential signal, and
where the first differential signal is determined from a first and a third portion of the image data and the second differential signal is determined from the first, a second, and the third portions of the image data; and
an enhancing circuit to enhance the portion of the image data with the enhancement data; and
a panel to display the enhanced image data.

11. A computer-readable medium containing computer instructions that, when executed, cause a processor or multiple communicating processors to perform a method for sharpening an edge in a frame, the method comprising:
receiving image data, wherein the image data corresponds to an edge of an image;
determining enhancement data from the image data, wherein determining the enhancement data comprises:
determining a first differential signal from a first portion and a third portion of the image data;
determining a second differential signal from the first portion, a second portion, and the third portion of the image data; and
determining an offset value from the first differential signal and the second differential signal, wherein the offset value comprises an enhancement luminance amplitude and an enhancement chrominance vector, wherein determining the enhancement luminance amplitude comprises applying the following equation:

$$\text{Offset}_l = \text{DFS}_l \times \text{MIN}(|2^{nd}\text{Diff}_l|, |1^{st}\text{Diff}_l|) - 2 \times 2^{nd}\text{Diff}_l$$

where Offset, is the enhancement luminance amplitude, $1^{st}\text{Diff}_l$ is the first differential signal, and $2^{nd}\text{Diff}_l$ is the second differential signal;
enhancing a portion of the image data, wherein enhancing a portion of the image data comprises applying the offset value to the portion of the image data; and
displaying the enhanced image data.

12. A computer-readable medium containing computer instructions that, when executed, cause a processor or multiple communicating processors to perform a method for sharpening an edge in a frame, the method comprising:
receiving image data, wherein the image data corresponds to an edge of an image;
determining enhancement data from the image data, wherein determining the enhancement data comprises:
determining a first differential signal from a first portion and a third portion of the image data;
determining a second differential signal from the first portion, a second portion, and the third portion of the image data; and
determining an offset value from the first differential signal and the second differential signal, wherein the offset value comprises an enhancement luminance amplitude and an enhancement chrominance vector, wherein determining the enhancement chrominance vector comprises applying the following equation:

$$Offset_c = DFS_c \times MIN(|2^{nd}Diff_c|, |1^{st}Diff_c|) - 2 \times 2^{nd}Diff_c$$

where $Offset_c$ is the enhancement chrominance vector, $1^{st}\,Diff_c$ is the first differential signal, and $2^{nd}\,Diff_c$ is the second differential signal;

enhancing a portion of the image data, wherein enhancing a portion of the image data comprises applying the offset value to the portion of the image data; and displaying the enhanced image data.

13. A computer-readable medium containing computer instructions that, when executed, cause a processor or multiple communicating processors to perform a method for sharpening an edge in a frame, the method comprising:

receiving image data, wherein the image data corresponds to an edge of an image;

determining enhancement data from the image data, wherein determining the enhancement data comprises:

determining a first differential signal from a first portion and a third portion of the image data;

determining a second differential signal from the first portion, a second portion, and the third portion of the image data; and determining an offset value from the first differential signal and the second differential signal, wherein the offset value comprises an enhancement luminance amplitude and an enhancement chrominance vector, wherein determining the enhancement luminance amplitude comprises applying the following equation:

$$Offset_l = DFS_l \times MIN(M \times |2^{nd}Diff_l|, |1^{st}Diff_l|) - 2 \times 2^{nd}Diff_l$$

where $Offset_l$ is the enhancement luminance amplitude, M is an edge enhancement aggressiveness parameter, $1^{st}\,Diff_l$ is the first differential signal, and $2^{nd}\,Diff_l$ is the second differential signal;

enhancing a portion of the image data, wherein enhancing a portion of the image data comprises applying the offset value to the portion of the image data; and displaying the enhanced image data.

14. A computer-readable medium containing computer instructions that, when executed, cause a processor or multiple communicating processors to perform a method for sharpening an edge in a frame, the method comprising:

receiving image data, wherein the image data corresponds to an edge of an image;

determining enhancement data from the image data, wherein determining the enhancement data comprises:

determining a first differential signal from a first portion and a third portion of the image data;

determining a second differential signal from the first portion, a second portion, and the third portion of the image data; and determining an offset value from the first differential signal and the second differential signal, wherein the offset value comprises an enhancement luminance amplitude and an enhancement chrominance vector, wherein determining the enhancement chrominance vector comprises applying the following equation:

$$Offset_c = DFS_c \times MIN(M \times |2^{nd}Diff_c|, |1^{st}Diff_c|) - 2 \times 2^{nd}Diff_c$$

where $Offset_c$ is the enhancement chrominance vector, M is an edge enhancement aggressiveness parameter, $1^{st}\,Diff_c$ is the first differential signal, and $2^{nd}\,Diff_c$ is the second differential signal;

enhancing a portion of the image data, wherein enhancing a portion of the image data comprises applying the offset value to the portion of the image data; and displaying the enhanced image data.

15. The system of claim 10 comprising a transmitter to output the enhanced image data to a display.

16. The system of claim 10 where the offset value is the enhancement data; and where the enhancing circuit mathematically manipulates the second portion of the image data with the offset value.

17. The system of claim 10 where the determining circuit determines the enhancement data by mathematically manipulating the second portion of image data with the offset value.

18. The system of claim 17 where the enhancement data corresponds to the first portion of the image data.

19. The system of claim 10 where the offset value is determined from an edge enhancement parameter capable of controlling the intensity of the offset value.

20. The system of claim 10 where each portion of the image data comprises a corresponding luminance amplitude and a corresponding chrominance vector.

21. The system of claim 20 where the determining circuit determines the enhancement luminance amplitude from the first, second, and third luminance amplitude, and the enhancement chrominance vector from the first, second, and third chrominance vector.

22. The system of claim 10 where the determining circuit checks the enhancement data for an error condition capable of causing a divergent color shift in the image data, and adjusts the enhanced image data to eliminate the divergent color shift.

23. The computer-readable medium of claim 11, wherein determining the first differential signal comprises applying the following equation:

$$1^{st}Diff_l = (A_l - C_l)/2$$

where $A_l$ is a luminance amplitude of the first portion of the image data, and where $C_l$ is a luminance amplitude of the third portion of the image data.

24. The computer-readable medium of claim 11, wherein determining the second differential signal comprises applying the following equation:

$$2^{nd}Diff_l = (2B_l - A_l - C_l)/4$$

where $A_l$ is a luminance amplitude of the first portion of the image data, where $B_l$ is a luminance amplitude of the second portion of the image data, and where $C_1$ is a luminance amplitude of the third portion of the image data.

25. The computer-readable medium of claim 12, wherein determining the first differential signal comprises applying the following equation:

$$1^{st}Diff_c = (A_c - C_c)/2$$

where $A_c$ is a chrominance vector of the first portion of the image data, and where $C_c$ is a chrominance vector of the third portion of the image data.

26. The computer-readable medium of claim 12, wherein determining the second differential signal comprises applying the following equation:

$$2^{nd}Diff_c = (2B_c - A_c - C_c)/4$$

where $A_c$ is a chrominance vector of the first portion of the image data, where $B_c$ is a chrominance vector of the second portion of the image data, and where $C_c$ is a chrominance vector of the third portion of the image data.

* * * * *

UNITED STATES PATENT AND TRADEMARK OFFICE
CERTIFICATE OF CORRECTION

PATENT NO. : 7,590,302 B1
APPLICATION NO. : 10/979688
DATED : September 15, 2009
INVENTOR(S) : Woodall It is certified that error appears in the above-identified patent and that said Letters Patent is hereby corrected as shown below:

Column 6, line 48, the words "These $B_{c_V}$" should read -- These $B_{c_U}$ --;

Column 10, line 43, the word "Offset," should read -- $Offset_l$ --.

Signed and Sealed this

Seventeenth Day of November, 2009

David J. Kappos
*Director of the United States Patent and Trademark Office*